A. HAUSER.
MACHINE FOR PULPING PLANTS CONTAINING TEXTILE FIBERS.
APPLICATION FILED JUNE 12, 1919.

1,381,830.

Patented June 14, 1921.
3 SHEETS—SHEET 1.

Inventor
Andre Hauser;
H. R. Kerslake.
By
Attorney

UNITED STATES PATENT OFFICE.

ANDRÉ HAUSER, OF LA CHAUX-DE-FONDS, SWITZERLAND.

MACHINE FOR PULPING PLANTS CONTAINING TEXTILE FIBERS.

1,381,830. Specification of Letters Patent. Patented June 14, 1921.

Application filed June 12, 1919. Serial No. 303,730.

*To all whom it may concern:*

Be it known that I, ANDRÉ HAUSER, a citizen of the Swiss Republic, residing at La Chaux-de-Fonds, Switzerland, have invented certain new and useful Improvements in Machines for Pulping Plants Containing Textile Fibers, of which the following is a specification.

The present invention relates to decorticating machines and more particularly to a machine for pulping plants containing textile fibers.

It is the primary aim and object of this invention to provide a machine of the above mentioned character comprising a series of improved coacting means for successfully scraping, conveying and crushing the plants so as to separate the fibers from the plants.

As an additional object the invention contemplates the provision of improved scraping drums for coacting with adjacent and lined tables and between which the plants are passed during the operation of the machine.

More especially the invention consists in the provision of improved means for feeding the plants to the main scraping drum; to provide improved coacting crushing rollers for acting on the plants; and to also provide an improved guard for coacting with the conveying apron and the drum which is also designed to act as a fan for catching plants not thoroughly separated at the first scraping operation and directing same toward the secondary scraping drum.

Among the other aims and objects may be recited the provision of a machine of the above mentioned character with a view to compactness wherein the number of parts are comparatively few, the construction simple, the cost of production low and the efficiency high.

Other objects, as well as the nature, characteristic features and the scope of the invention will be more readily apparent from the following description taken in connection with the accompanying drawings and pointed out in the claims, forming a part of this specification.

The invention is clearly illustrated in the accompanying drawings, in which:—

Similar characters of reference are employed in all of the above described views to indicate corresponding parts.

Figure 1:
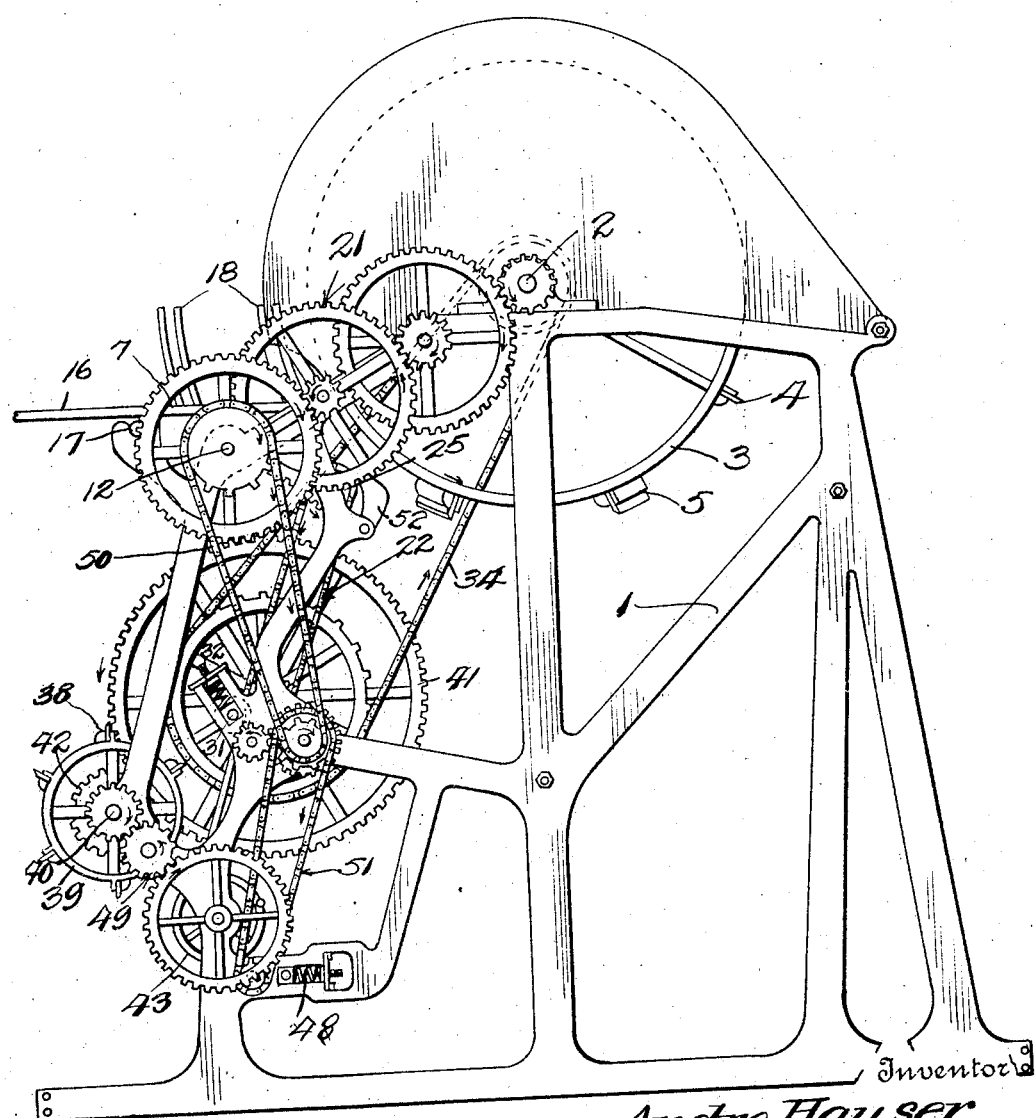
Figure 1 is a side elevational view of the improved machine.
Figure 2:
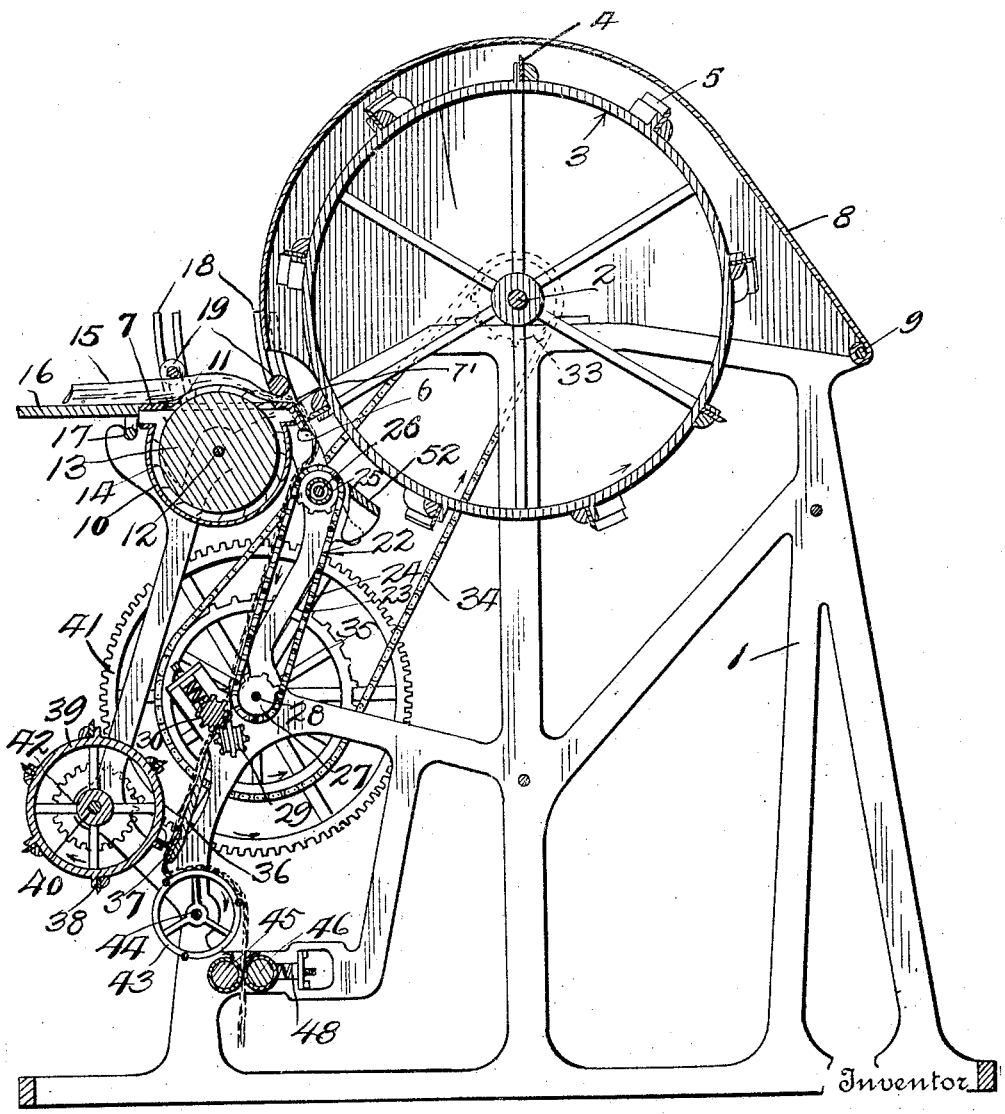
Fig. 2 is a vertical longitudinal sectional view thereof.
Figure 3:
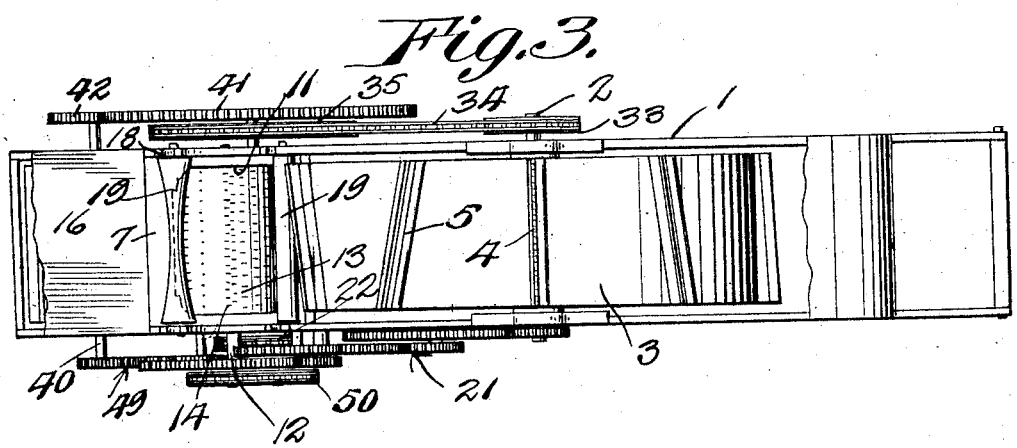
Fig. 3 is a top plan view of the invention.
Figure 4:
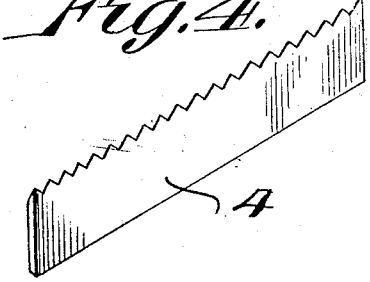
Fig. 4 is a perspective detail of one of the scrapers on the main drum.
Figure 5:
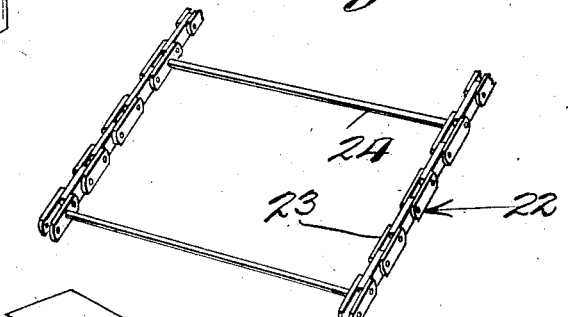
Fig. 5 is a fragmentary perspective detail of the endless conveyer
Figure 6:
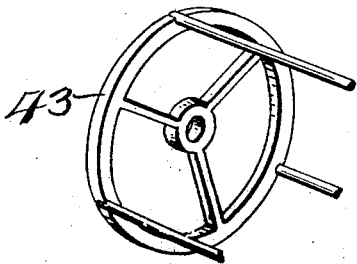
Fig. 6 is a fragmentary perspective detail of the conveying drum.
Figure 7:
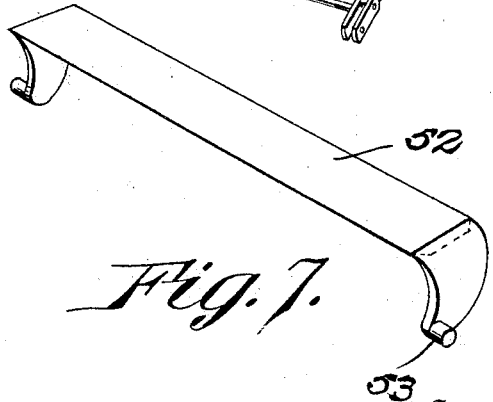
Fig. 7 is a perspective detail of the guard.

Referring now, more particularly, to the accompanying drawings there is provided a supporting frame 1 on the upper end of which is rotatably mounted a main shaft 2 to which rotary motion may be imparted in any suitable manner. Carried by this shaft 2 between the sides of the frame is an improved scraping drum generally designated 3 on the outer periphery of which is mounted a series of alternately arranged transversely and diagonally disposed serrated and smooth scrapers 4 and 5 respectively the scraping edges of which are designed to coact with the protected extension 6 of a table 7 carried at the upper part of the frame and forwardly of the drum 3, and protected by a covering 7' of leather. A cover 8 is pivoted as at 9 on the frame and is designed to lie over the upper part of the drum so as to coact with the scrapers thereof in forming a fan for purposes that will hereinafter become apparent.

With a view toward providing an improved means for feeding plants to the scraping drum a casing 10 is rigidly mounted beneath the opening 11 in the table 7 while carried on a transverse shaft 12 in the frame and disposed within the casing and projecting slightly through the opening 11 in the table is a feed roller 13 from the periphery of which extends a plurality of pins or brads 14 designed to engage the plants 15 deposited on the table 7 from a supporting platform 16. The inner end of the platform is designed to rest in hook-like extensions 17 of the supporting frame so that this platform may be arranged at an inclination to allow the plants being acted upon to slide by their own weight down to the table 7 so that they may be subsequently easily engaged by the pins in the feed roll. To further assist in the feeding of the material to the drum 2 opposed pairs of guides 18 extend upwardly from the table 7 and slidably and rotatably receive the trunnions of gravity rollers 19, the said guides being respectively positioned near the front and rear edges of the table to insure of the engagement of the plants which pass beneath the rollers 19 to be engaged by the feed roller and to also hold the plants in close relation to the inner end of the table to insure of an effective engagement of the plants between the scrapers 4 and 5 and the protective extension 6 of the table.

In connection with the feeding means it is desired that the speed of rotation of the scraping drum 3 be considerably greater than that of the feed roller 13 so as to insure of an efficient operation of the apparatus and in affecting this purpose a suitable train of gearing generally designated by the numeral 21 is mounted on one side of the supporting frame between the shafts 2 and 12.

Coacting with the scraping drum 2 is the improved conveying and crushing means, in the present instance consisting of an endless conveyer generally designated by the numeral 22 said conveyer being arranged between the sides of the frame and at an inclination with the upper portion positioned beneath the lined extension 6 of the table 7. The conveyer comprises chains 23 connected by rods 24 and operating respectively over spaced sprocket wheels 25 mounted on a shaft 26 and other spaced sprocket wheels 27 mounted on a transverse shaft 28 in the frame. The conveyer delivers the material between coacting rotatable longitudinally grooved or corrugated rollers 29 and 30 the trunnions of the latter being journaled in slidable bearings 31 tensioned by springs 32 so as to be held in yielding contact with the roller 28. This conveyer rotates at the same rate of speed as the drum motion being transmitted from a sprocket wheel 33 on the shaft 2 by a chain 34 operating about another sprocket wheel 35 on the said shaft 28.

From the crushing rollers 29 and 30 which in addition to separating the fibers expel a part of the water therefrom, the material is delivered on an inclined table 36 on the lower edge of which is in turn secured a flexible protector 37 with which coacts scrapers 38 of a secondary scraping drum 39. This drum is carried by a transverse shaft 40 in the lower part of the supporting frame and receives its motion from a large gear 41 carried by the shaft 28 which meshes with a pinion 42 on the said shaft 40.

A conveying drum 43 is mounted on a transverse shaft 44 in the lower part of the frame and is positioned to receive the material delivered from the table 36 and conveys this material so that it will be passed between squeeze rollers 45 and 46 also mounted transversely of the frame and beneath the drum. The roller 46 like the roller 30 is yieldingly mounted as at 48 while both the rollers 45 and 46 are covered with leather or rubber so as to thoroughly smooth the fibers and drive out the remaining water therein thereby completing the separating operation.

In connection with the foregoing it is to be observed that motion is transmitted from the shaft 40 to the shaft 44 through a train of gearing generally designated by the numeral 49.

In operating the rollers 29 and 30 and the rollers 45 and 46 at substantially the same rate of speed as rollers 13 endless chains 50 and 51 are employed and respectively impart rotary motion from the shaft 12 to the trunnions of the roller 29 and from the trunnions of the roller 29 to the trunnions of the roller 45, the direction of the rotation of the several rollers and drums for the sake of convenience being indicated by arrows on the drawings. It is to be particularly observed that all of the parts actuate simultaneously and at the desired ratios for insuring of an effective decorticating operation on the plants.

A guard 52 in the form of a plate is fitted with trunnions 53 on its angularly bent end portions and are fixed in extensions on the sides of the supporting frame so that the plant is maintained in proximity to the top of the conveyer 22 being adapted to catch any plants which are not thoroughly separated or pulped and to hold the same in contact with the conveyer through the assistance of a blast of air from the scraping drum-fan and ultimately carried by the conveyer 23 to the rollers 29 and 30.

The mode of operation of the present invention may be reviewed as follows:

Assuming that plants are delivered by gravity to the table 7 the same are engaged by the feed roller and passed beneath the rollers 19 and thence directed on the protected extension 6 of the table 7 at which point the plants are engaged by the scrapers 4 and 5 and are thence delivered on the endless conveyer 22, the guard 52 serving to catch any plants not thoroughly separated so that the same will be applied or held near the conveyer this action being facilitated by the fan-like action of the drum 3 to insure of the plants passing down the conveyer to the first set of crushing rollers 29 and 30. As the fibers pass between these rollers they are crushed and part of the water extracted therefrom. From the rollers they are delivered on the table 36 and acted upon by the secondary scraping drum 39 and thence delivered on the conveying drum 43 and finally directed between the squeeze rollers 45 and 46 where they are thoroughly separated and all of the water squeezed therefrom.

It is believed in view of the foregoing that a further detailed description of the operation is entirely unnecessary. Likewise it is believed that the advantages of the invention will be readily apparent.

Having thus fully described the invention what is claimed as new and desired to be secured by Letters Patent is:

1. A machine of the character described including a supporting frame, a table having a protected extension, a scraping drum rotatably mounted on the frame and coacting with the extension, means for feeding plants between the drum and the table, coacting crushing rollers rotatably mounted in the frame, conveying means between the scraping drum and the crushing rollers, a secondary table beneath the rollers, a protecting strip on the lower portion of the table, a secondary scraping drum for coacting with the strip on the table, a rotatably mounted conveying drum for receiving material from the secondary drum and squeezing rollers rotatably mounted in the frame between which material is passed from the conveying drum.

2. A machine as claimed in claim 1 wherein a cover is provided over the main scraping drum to coact therewith in forming a fan, and a guard mounted in the frame and coacting with the drum-fan and the conveying means for preventing the escape of non-pulped plants.

3. A machine as claimed in claim 1 wherein the main drum is provided with a plurality of scrapers arranged alternately, diagonally and transversely thereof.

4. In a machine as claimed in claim 3 wherein the transversely disposed scrapers are toothed while the diagonally disposed scrapers are provided with smooth outer edges.

5. In a machine of the character described in combination, a supporting frame, a scraping drum rotatably mounted thereon, a table having a portion in proximity to the scraping surfaces of the drum and a protecting lining of flexible material on that portion of the table in proximity to the drum from coacting with the scraping surfaces of the drum.

6. A machine of the character described including in combination, a supporting frame, a scraping drum rotatably mounted on the frame, a table mounted on the frame and provided with an opening, a casing beneath the table, a barbed feeding roller rotatably mounted in the casing and projecting through and above the opening in the table, opposed pairs of guides mounted near the respective ends of the table and gravity rollers rotatably and slidably mounted in the guides and coacting with the barbed roller and the table in holding the material being fed in proper relation to be engaged by the roller and by and between the scraping drum and the table.

7. A machine as claimed in claim 6 wherein a cover is mounted over the scraping drum to coact therewith in producing an air blast for facilitating the holding of the material against the table so as to be acted upon by the drum.

8. A machine as claimed in claim 6 wherein a conveyer is employed for conducting material away from the drum and a guard coacting with the conveyer in insuring of the passage of all of the non-pulped material down the conveyer.

In testimony whereof I have signed my name to this specification.

ANDRÉ HAUSER.